United States Patent
Yeh et al.

(10) Patent No.: US 8,076,879 B2
(45) Date of Patent: Dec. 13, 2011

(54) FAN CONTROLLING CIRCUIT

(75) Inventors: Chin-Wen Yeh, Taipei Hsien (TW);
Zhi-Jian Peng, Shenzhen (CN);
Hai-Shan Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 652 days.

(21) Appl. No.: 12/241,682

(22) Filed: Sep. 30, 2008

(65) Prior Publication Data
US 2010/0014843 A1  Jan. 21, 2010

(30) Foreign Application Priority Data
Jul. 18, 2008 (CN) .......................... 2008 1 0302790

(51) Int. Cl.
*H02P 6/06* (2006.01)
(52) U.S. Cl. ......... 318/400.06; 318/400.01; 318/400.07; 318/799
(58) Field of Classification Search ............ 318/400.01, 318/400.06, 400.14, 599, 701, 779, 799, 318/268, 400.07, 400.1, 400.11, 400.37, 318/560, 721; 388/907, 911
See application file for complete search history.

(56) References Cited

U.S. PATENT DOCUMENTS

| | | | | |
|---|---|---|---|---|
| 5,019,757 A * | 5/1991 | Beifus | ...................... | 318/400.07 |
| 5,796,194 A * | 8/1998 | Archer et al. | ............... | 310/68 B |
| 5,952,798 A * | 9/1999 | Jones et al. | .................... | 318/268 |
| 6,054,823 A * | 4/2000 | Collings et al. | .......... | 318/400.04 |
| 6,219,795 B1 * | 4/2001 | Klein | ............................ | 713/300 |
| 6,515,447 B2 * | 2/2003 | Horng et al. | .................. | 318/807 |
| 6,545,438 B1 * | 4/2003 | Mays, II | .................. | 318/400.01 |
| 6,997,684 B2 * | 2/2006 | Hahn et al. | .................. | 417/44.1 |
| 7,275,380 B2 * | 10/2007 | Durant et al. | .................... | 62/178 |
| 7,279,857 B2 * | 10/2007 | Babb et al. | .............. | 318/400.23 |
| 7,301,294 B2 * | 11/2007 | Ogino et al. | ............. | 318/400.05 |
| 7,420,340 B2 * | 9/2008 | Ogino et al. | .................. | 318/268 |
| 7,564,204 B2 * | 7/2009 | Ogino et al. | .................. | 318/400.01 |
| 7,626,350 B2 * | 12/2009 | Mori et al. | .................... | 318/432 |
| 7,710,054 B2 * | 5/2010 | Alberkrack et al. | ..... | 318/400.06 |

* cited by examiner

*Primary Examiner* — Paul Ip
*Assistant Examiner* — Antony M Paul
(74) *Attorney, Agent, or Firm* — Altis Law Group, Inc.

(57) ABSTRACT

A fan controlling circuit for detecting rotational speed of a fan, includes a comparison circuit and a controlling chipset. The comparison circuit receives a rotational speed signal from the fan at one input terminal, a reference voltage at another input terminal, and outputs a filtered rotational speed signal at an output terminal. The controlling chipset receives the filtered rotational speed signal, and outputs control signals to control the rotational speed of the fan.

13 Claims, 2 Drawing Sheets

FAN CONTROLLING CIRCUIT

BACKGROUND

1. Technical Field

The present invention relates to a fan controlling circuit for detecting rotational speed of a fan.

2. Description of Related Art

Developments in today's highly information-intensive society have led to remarkable improvements in performances of electronic devices. During operation of many contemporary electronic devices such as central processing units (CPUs), large amounts of heat are produced. Typically, an electric fan is used to facilitate removal of the heat. The fan must run stably, so as to prevent the device from becoming unstable or damaged. A controlling circuit accompanying the fan is important to ensure the fan is running normally. Unfortunately, noise signals interfere with rotational speed signals of a typical fan controlling circuit.

Therefore, a new fan controlling circuit for detecting rotational speed of a fan is desired to overcome the above-described deficiency.

DETAILED DESCRIPTION OF THE EMBODIMENTS

Figure 1:
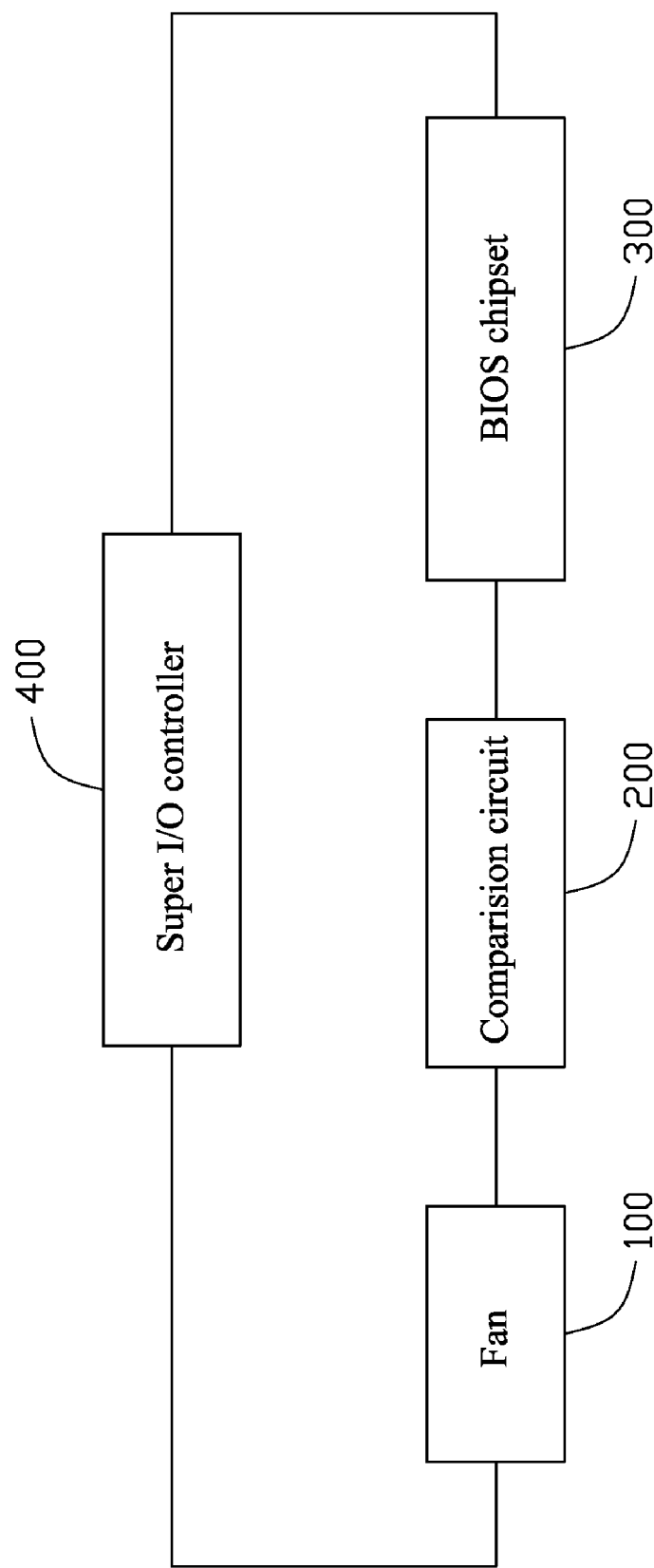
FIG. 1 is a block diagram of an embodiment of a fan controlling circuit.

Referring to FIG. 1, an embodiment of a fan controlling circuit for detecting a rotational speed of a fan includes a fan 100, a comparison circuit 200, a basic input output system (BIOS) chipset 300, and a super input/output (super I/O) controller 400. The fan 100 receives a pulse width modulation (PWM) signal from the super I/O controller 400, and outputs a rotational speed signal. The comparison circuit 200 receives the rotational speed signal from the fan 100, and outputs a filtered rotational speed signal. The BIOS chipset 300 receives the filtered rotational speed signal, and outputs a control signal according to the filtered rotational speed signal. The super I/O controller 400 receives the control signal from the BIOS chipset 300, and outputs the PWM signal to control the rotational speed of the fan 100.

Figure 2:
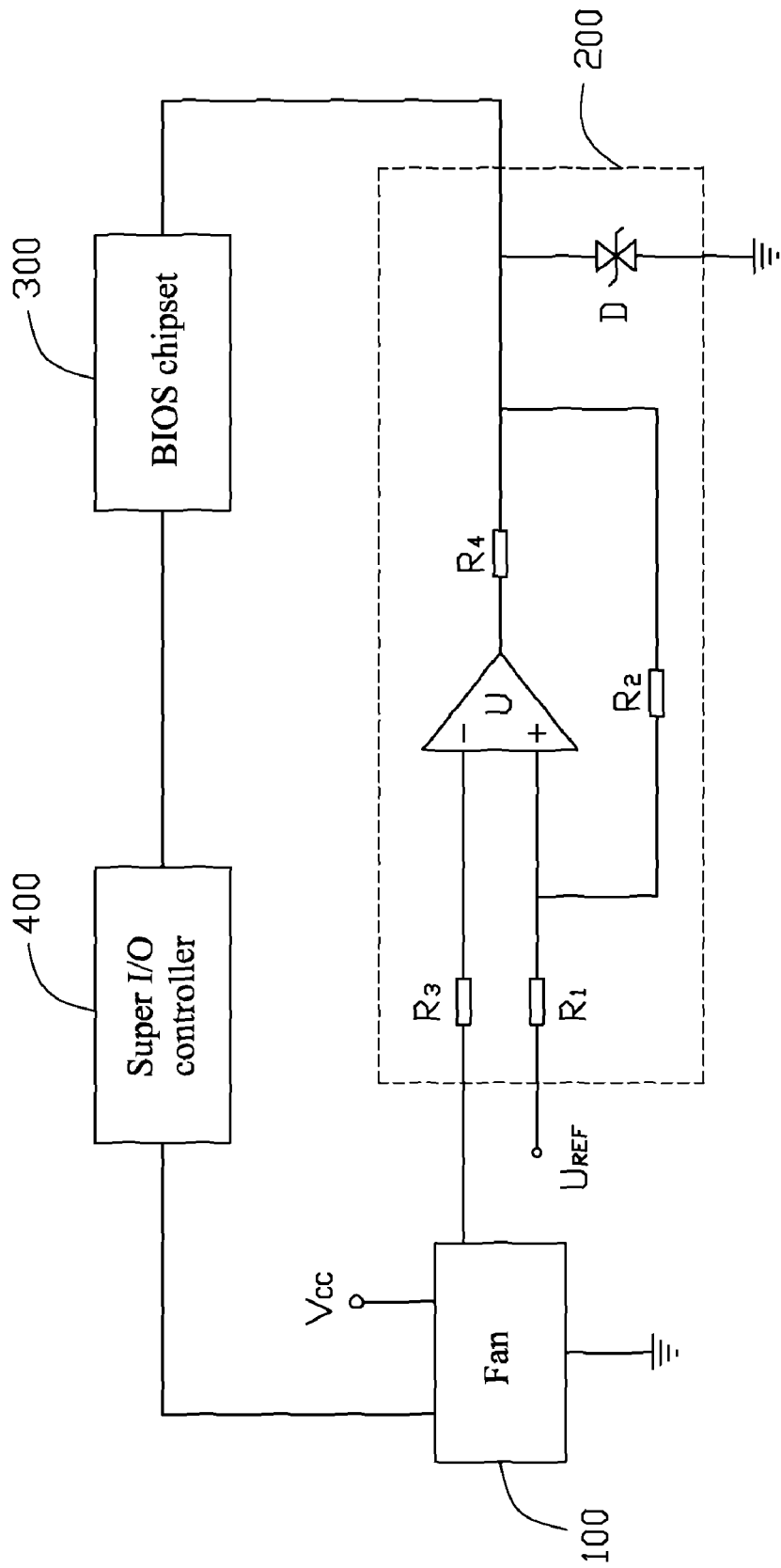
FIG. 2 is a circuit diagram of an embodiment of the fan controlling circuit.

FIG. 2 is a circuit diagram of an embodiment of the fan controlling circuit. The comparison circuit 200 includes a comparator U, resistors R1, R2, R3, R4, and a zener diode D. The inverting input terminal of the comparator U is coupled to an output terminal of the fan 100 via the resistor R3. The non-inverting input terminal of the comparator U is configured to receive a reference voltage $U_{REF}$ via the resistor R1. The output terminal of the comparator U is coupled to the BIOS chipset 300 via the resistor R4. A node between the BIOS chipset 300 and the resistor R4 is coupled to the non-inverting input terminal of the comparator U via the resistor R2, and is coupled to ground via the diode D.

The comparison circuit 200 has an upper threshold voltage $U_{TH1}$, a lower threshold voltage $U_{TH2}$, and a threshold voltage width $\Delta U$. In one embodiment, $$U_{TH1} = \frac{R_2 U_{REF}}{R_1 + R_2} + \frac{R_1 U_{OUT}}{R_1 + R_2} \quad (1)$$

$$U_{TH2} = \frac{R_2 U_{REF}}{R_1 + R_2} - \frac{R_1 U_{OUT}}{R_1 + R_2} \quad (2)$$

$$\Delta U = U_{TH1} - U_{TH2} \quad (3)$$
$$= 2 \frac{R_1 U_{OUT}}{R_1 + R_2}$$

where $U_{OUT}$ is an output voltage of the comparison circuit 200. $\Delta U$ can be adjusted by changing resistances of the resistors R1, R2. In this embodiment, $\Delta U$ is adjusted to have greater amplitude than that of noise signals. $U_{OUT}$ is delayed, while noise signals are filtered by the comparison circuit 200 because they can not exceed $U_{TH1}$ and $U_{TH2}$. Thus, noise is avoided by the controlling circuit.

In one embodiment, $U_{REF}$ is randomly set, and the diode D is a dual zener diode. The rotational speed signal from the fan 100 is filtered by the comparison circuit 200. The BIOS chipset 300 receives the filtered rotational speed signal and outputs accurate control signals to the super I/O controller 400. The super I/O controller 400 outputs the PWM signals to control the rotational speed of the fan 100 precisely. The diode D provides overvoltage protection to the controlling circuit. When $U_{OUT}$ is too high, the diode D breaks down and is coupled to ground. The BIOS chipset 300 is prevented from being destroyed.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan controlling circuit for detecting a rotational speed of a fan, comprising:
    a comparison circuit configured for receiving a rotational speed signal from the fan at one input terminal, a reference voltage at another input terminal, and outputting a filtered rotational speed signal at an output terminal; and
    a controlling chipset for receiving the filtered rotational speed signal, and outputting a control signal to control the rotational speed of the fan; wherein the comparison circuit comprises a comparator, a first resistor, and a second resistor; the inverting input terminal of the comparator is configured to receive the rotational speed signal; the non-inverting input terminal of the comparator is configured to receive the reference voltage via the first resistor; the output terminal of the comparator is coupled to the controlling chipset to output the filtered rotational speed signal, and is coupled to the non-inverting input terminal of the comparator via the second resistor.

2. The fan controlling circuit of claim 1, wherein the comparison circuit has a threshold voltage width greater than amplitudes of noise signals.

3. The fan controlling circuit of claim 2, wherein the comparison circuit further comprises a third resistor and a fourth resistor; the inverting input terminal of the comparator is configured to receive the rotational speed signal via the third resistor; the output terminal of the comparator is coupled to the controlling chipset and the second resistor via the fourth resistor.

4. The fan controlling circuit of claim 3, wherein the comparison circuit further comprises a zener diode, a node between the second and fourth resistors is grounded via the zener diode.

5. The fan controlling circuit of claim 4, wherein the zener diode is a dual zener diode.

6. The fan controlling circuit of claim 5, further comprising a super input/output controller configured for receiving the control signals, and outputting a pulse width modulation signal to control the rotational speed of the fan.

7. The fan controlling circuit of claim 6, wherein the controlling chipset is a basic input output system chipset.

8. A fan controlling circuit for detecting a rotational speed of a fan, comprising:
- a comparison circuit configured for receiving a rotational speed signal from the fan at one input terminal, a reference voltage at another input terminal, and outputting a filtered rotational speed signal at an output terminal;
- a controlling chipset for receiving the filtered rotational speed signal, and outputting a control signal; wherein the comparison circuit comprises a comparator, a first resistor, and a second resistor; the inverting input terminal of the comparator is configured to receive the rotational speed signal; the non-inverting input terminal of the comparator is configured to receive the reference voltage via the first resistor; the output terminal of the comparator is coupled to the controlling chipset, and is coupled to the non-inverting input terminal of the comparator via the second resistor; and
- a super input/output controller configured for receiving the control signals, and outputting a pulse width modulation signal to control the rotational speed of the fan.

9. The fan controlling circuit of claim 8, wherein the comparison circuit has a threshold voltage width greater than amplitudes of noise signals.

10. The fan controlling circuit of claim 9, wherein the comparison circuit further comprises a third resistor and a fourth resistor; the inverting input terminal of the comparator is configured to receive the rotational speed signal via the third resistor; the output terminal of the comparator is coupled to the controlling chipset and the second resistor via the fourth resistor.

11. The fan controlling circuit of claim 10, wherein the comparison circuit further comprises a zener diode, a node between the second and fourth resistors is grounded via the zener diode.

12. The fan controlling circuit of claim 11, wherein the zener diode is a dual zener diode.

13. The fan controlling circuit of claim 12, wherein the controlling chipset is a basic input output system chipset.

* * * * *